(12) United States Patent
Kumar

(10) Patent No.: US 11,055,727 B1
(45) Date of Patent: Jul. 6, 2021

(54) ACCOUNT FRAUD DETECTION

(71) Applicant: Cox Communications, Inc., Atlanta, GA (US)

(72) Inventor: Uday R. Kumar, Elmhurst, IL (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 390 days.

(21) Appl. No.: 15/979,508

(22) Filed: May 15, 2018

(51) Int. Cl.
*G06Q 30/00* (2012.01)
*G06N 7/02* (2006.01)
*H04L 29/06* (2006.01)
*H04W 12/12* (2021.01)
*G06Q 30/02* (2012.01)

(52) U.S. Cl.
CPC .......... *G06Q 30/0185* (2013.01); *G06N 7/02* (2013.01); *H04L 63/126* (2013.01); *H04W 12/12* (2013.01); *G06Q 30/0248* (2013.01)

(58) Field of Classification Search
None
See application file for complete search history.

(56) References Cited

U.S. PATENT DOCUMENTS

| | | | |
|---|---|---|---|
| 8,484,132 B1 * | 7/2013 | Christiansen | G06Q 40/00 705/35 |
| 2016/0086263 A1 * | 3/2016 | Weinflash | G06Q 40/025 705/38 |

* cited by examiner

*Primary Examiner* — Lynda Jasmin
*Assistant Examiner* — Laura Yesildag
(74) *Attorney, Agent, or Firm* — Merchant & Gould P.C.

(57) ABSTRACT

An improvement to the timespan for processing very large data sets using fuzzy logic to analyze billions of combinations of characters to enable an early detection of identity masking corresponding to new account fraud is provided. An identity masking fraud detection system is provided that receives new client data records including identifying information, compares the identifying information against prior user profiles stored in a database, determines when a prior user profile is matched with the identity information in the new client data record, and flags the new client data record and corresponding prior user profile as suspicious when an unresolved transaction is identified in associated with the prior user profile. The system prompts the new client user for additional identification information to verify that the new client user is not associated with the prior user profile or for the new client user to resolve the unresolved transaction.

20 Claims, 7 Drawing Sheets

ACCOUNT FRAUD DETECTION

BACKGROUND

Being able to efficiently detect new account fraud is a technical problem that exists when establishing new accounts for individuals. New account fraud is a form of financial identity theft where a new account with a provider is established using fraudulent personal identifying information to obtain products and services. There are numerous forms of new account fraud that can occur. Currently, new account fraud associated with opening of accounts in the utility, pay television, and wireless communication sectors can equate to as much as twenty percent of all identity theft. In some cases, an individual uses another entity's personal identifying information and uses that entity's good credit standing to obtain products or services that the individual is denied from obtaining due to a history of non-payment by the individual. In some cases, the individual is a prior client or customer of the provider and the individual fraudulently masks his/her identity to obtain products or services from the provider under the guise of being a new client, for example, to avoid resolving a previously unmet obligation with the provider.

Being unable to efficiently detect new account fraud is a technical problem that exists due at least in part to expenditures of a provider's resources (e.g., processing resources, money, workforce, manpower) on fraudulent accounts. For example, providers oftentimes make an initial investment of expenditures of processing resources, labor resources, equipment costs, and other resources when acquiring new clients. These initial investments are made with an expectation of a recuperation of expended costs with the revenues received from these new clients over a period of time that the provider retains the clients' business. According to one example use case scenario, setting up a new customer with cable television service and equipment can cost the provider roughly $500, which can take approximately a year for the cable television service provider to recuperate. Some companies require deposits from select clients to help offset the initial investment costs and to protect against losses from non-paying clients. For example, a provider may conduct a credit check for new clients or check a database to determine whether a new client has an unmet obligation with the provider or another provider. However, some individuals may have an outstanding obligation with the provider and may use fraudulent personal identifying information to mask themselves as new clients to avoid satisfying their obligations.

As can be appreciated, when new account fraud goes undetected or is not detected prior to an expenditure of resources, providers are defrauded of their expenditures of resources and of masked individuals' unresolved obligations. Accordingly, a technical solution is needed to improve the efficiency of new user identification verification to identify suspicious activity corresponding to personal identifying information of a new client and to satisfy any unresolved transactions prior to expending resources.

SUMMARY

Aspects of the present disclosure provide a system, method, and computer readable medium for verifying personal identifying information of a new user. The system comprises a data store storing data for new data records, prior client user profiles, and transaction records. Each data record includes personal identifying information related to a new client user, each prior client user profile includes personal identifying information related to an existing or previous client, and transaction records include information associated with resolved and unresolved transactions. A new record entry portal is in data communication with the data store and an identity masking fraud detection system. The new record entry portal is operative or configured to receive data records in association with establishing new client accounts, store the data records in the data store such that the records can be accessed by the identity masking fraud detection system. The identity masking fraud detection system includes a machine learning engine and is operative or configured to efficiently identify suspicious activity associated with a new client user of a received data record in association with a prior client user profile, audit data (including transaction record data) associated with the identified suspicious activity, and when the corresponding user profile includes an unresolved transaction, prompt the new client user to resolve the unresolved transaction or to provide additional personal identifying information to validate that the user is not associated with the corresponding user profile. When validation criteria are met, the identity masking fraud detection system allows work orders to be received by an order fulfillment system. The order fulfillment system is operative or configured to perform processes correlating to providing goods or services to new clients associated with the received data records.

Aspects provide an improvement to the timespan needed to process very large data sets using fuzzy logic to analyze billions of combinations of characters to enable an early detection of identity masking related to new account fraud. According to one example use case, a service provider may receive approximately 100,000 new client data records in a month. Utilizing aspects of the present disclosure, approximately 1,500 of these new client data records may be determined to be suspicious, and approximately 500 to 1,000 of the suspicious records prove to be individuals attempting to mask their identities for defrauding the service provider. By efficiently identifying suspicious activity corresponding to a new client user of a received data record that matches a prior client user profile, the identity masking fraud detection system is able to detect new account fraud prior to expending resources on establishing a fraudulent new client user account. Further, efficiently detecting new account fraud can enable a provider to collect a user's arrearage prior to expending resources on the fraudulent user. For example, by being able to efficiently identify these fraudulent users in a shortened timespan, the service provider is able to avoid expending processing resources, manpower resources, equipment resources, etc., which, at an estimated cost of $500 per new client user to set up services, the provider is able to avoid expenditures of approximately $250,000 to $500,000 a month on fraudulent accounts. Further, the provider may be enabled to collect on balances these fraudulent users owe.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure provide an improvement to the processing times associated with processing very large data sets using fuzzy logic to analyze billions of combinations of characters to enable an early detection of identity masking corresponding to new account fraud. For example, an identity masking fraud detection system is described herein that is operative to process large volumes of user identification information preferably prior to expending resources related to setting up a fraudulent user (i.e., a user masking his/her identity to defraud a provider) as a client that is enabled to receive goods or services from a provider system. This early detection enables providers of services or goods to minimize an expenditure of resources for users who are fraudulently making their identities.

Figure 1:
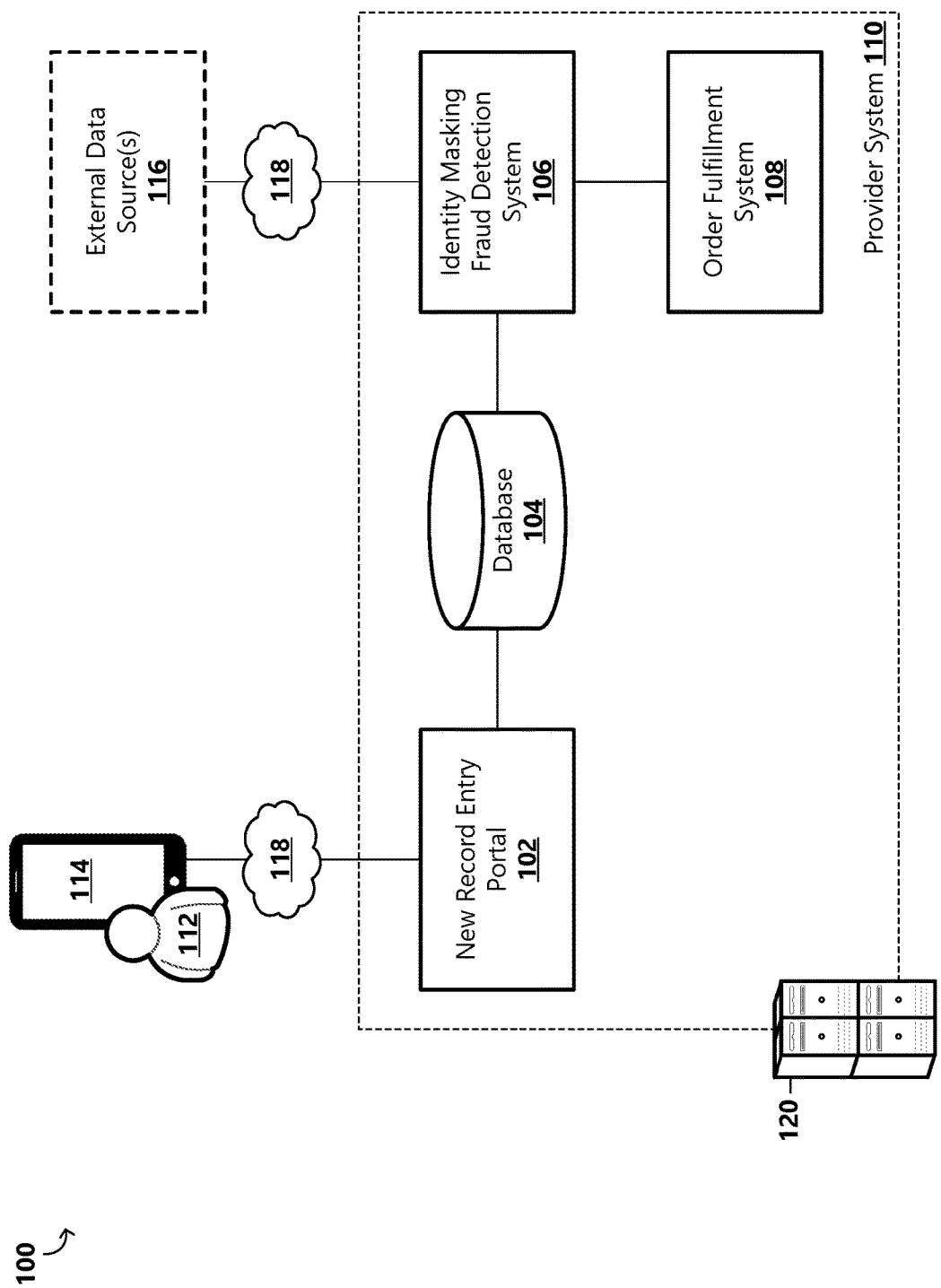
FIG. 1 is a block diagram of an example environment in which an identity masking fraud detection system of the present disclosure can be implemented.

FIG. 1 is a block diagram of an example environment 100 in which an identity masking fraud detection system 106 can be implemented, but is not so limited. As shown in FIG. 1, the example environment 100 includes a provider system 110 that includes one or more computing devices 120 such as servers, workstations, desktop computers, laptop computers, tablets, smart devices, etc., and one or more databases 104. Further details of the computing devices 120 and variations thereof can be found in FIGS. 6, 7A, and 7B. The example environment 100 further includes a network 118 or group of networks that enables communication between the provider system 110, external data sources 116, and new client users 112 (and client user devices 114). Although an example client user device 114 is illustrated as a mobile phone in FIG. 1, the client device can be embodied as various types of communication and computing devices; a mobile phone is just one example. The network 118 or networks can be wired or wireless, and can encompass a variety of network types including, but not limited to, the Internet, intranet, extranet, local-area networks, wide-area networks, fiber-coax networks, public switched telephone networks, global telephone networks, etc., and combinations thereof.

According to an aspect, the provider system 110 includes a new record entry portal 102 illustrative of a software application, module, or computing device operative or configured to receive personal identifying information for a new client user 112, build a data record including the received personal identifying information (included as attributes), and store the data record in a database 104. For example, the new client user 112 may be an individual attempting to subscribe to services (e.g., Internet, cable or satellite television, phone, electricity, gas) provided by a service provider. Thus, the individual may be providing personal identifying information and other information, such as a selection or specification of services the individual desires to subscribe to, to the service provider in order to establish an account with the service provider for subscribing to the desired services. In some examples, personal identifying information for a new client user 112 is entered by the new client user into a provider-associated web or HTML (Hypertext Markup Language) page hosted by a web server and provided to the new client user via a browser application executing on the new client user's device 114. The entered information is transmitted over the network 118 to the new record entry portal 102, which receives the information and builds a data record comprising the received information, and stores the data record in the database 104. In other examples, the new record entry portal 102 provides a user interface (UI) to a provider system user via a computing device that enables the provider system user (e.g., customer service representative for the provider) to enter personal identifying information for a new client user 112 attempting to subscribe to services into the new record entry portal 102. As should be appreciated, other systems and methods for entering personal identifying information and for receiving the personal identifying information are possible and are within the scope of the present disclosure.

According to an aspect, personal identifying information that is collected and entered into the new record entry portal 102 can include a variety of information that can directly identify a person or that are linked to information that identifies a person. For example, personal identifying information collected for a new client user 112 can include information such as, but not limited to, name (e.g., first name, middle name, middle initial, last name, title, honorific, nickname), address, phone number(s), social security number, email address(es), account login information (e.g., username, login identifier (ID), PIN number, password), drivers license number or other state-issued identification number, financial account number (e.g., credit card number, debit card number), etc. In building a new client data record 202, the new record entry portal 102 is operative to save the collected personal identifying information as attributes of the new client data record, wherein these attributes are compared against attributes of prior client user profiles 214 as described below.

In some examples, the database 104 is comprised of multiple servers (computing devices 120) and is embodied as an enterprise data warehouse that is a unifying repository that holds historical and current business information and provides the identity masking fraud detection system 106, and other systems across the provider system 110, quick and efficient access to stored information to enable the provider to make effective decisions. In some implementations, an enterprise data warehouse can include an operational data store, where current data, such as new data records (e.g., data records created within a specified time period, data records that have not yet been processed by the identity masking fraud detection system 106 or order fulfillment system 108), are stored. As will be described in further detail below with respect to FIG. 2, the database 104 stores other information (e.g., existing client user profile data, prior client user profile data, transactional data, learning data) that are accessed by the identity masking fraud detection system 106 for identifying suspicious activity related to fraudulent identity masking and for verifying new client user identification.

In some implementations, the identity masking fraud detection system 106 is integrated with the database 104 (e.g., when embodied as an enterprise data warehouse). In other implementations, the identity masking fraud detection system 106 is separate from the database 104. In some implementations, the identity masking fraud detection system is in data communication with one or more external data sources 116 for accessing relevant data associated with new client users 112, such as, but not limited to, credit report data (e.g., a credit score), previous and/or current name information, previous and/or current address information, previous and/or current phone numbers, social security number verifications, deceased indications, etc. According to examples, the identity masking fraud detection system 106 is able to access data stored in the database 104 and data offered by external data sources 116 via direct Structured Query Language (SQL) calls or SQLs that are imbedded in Application Programming Interfaces (APIs).

Figure 2:
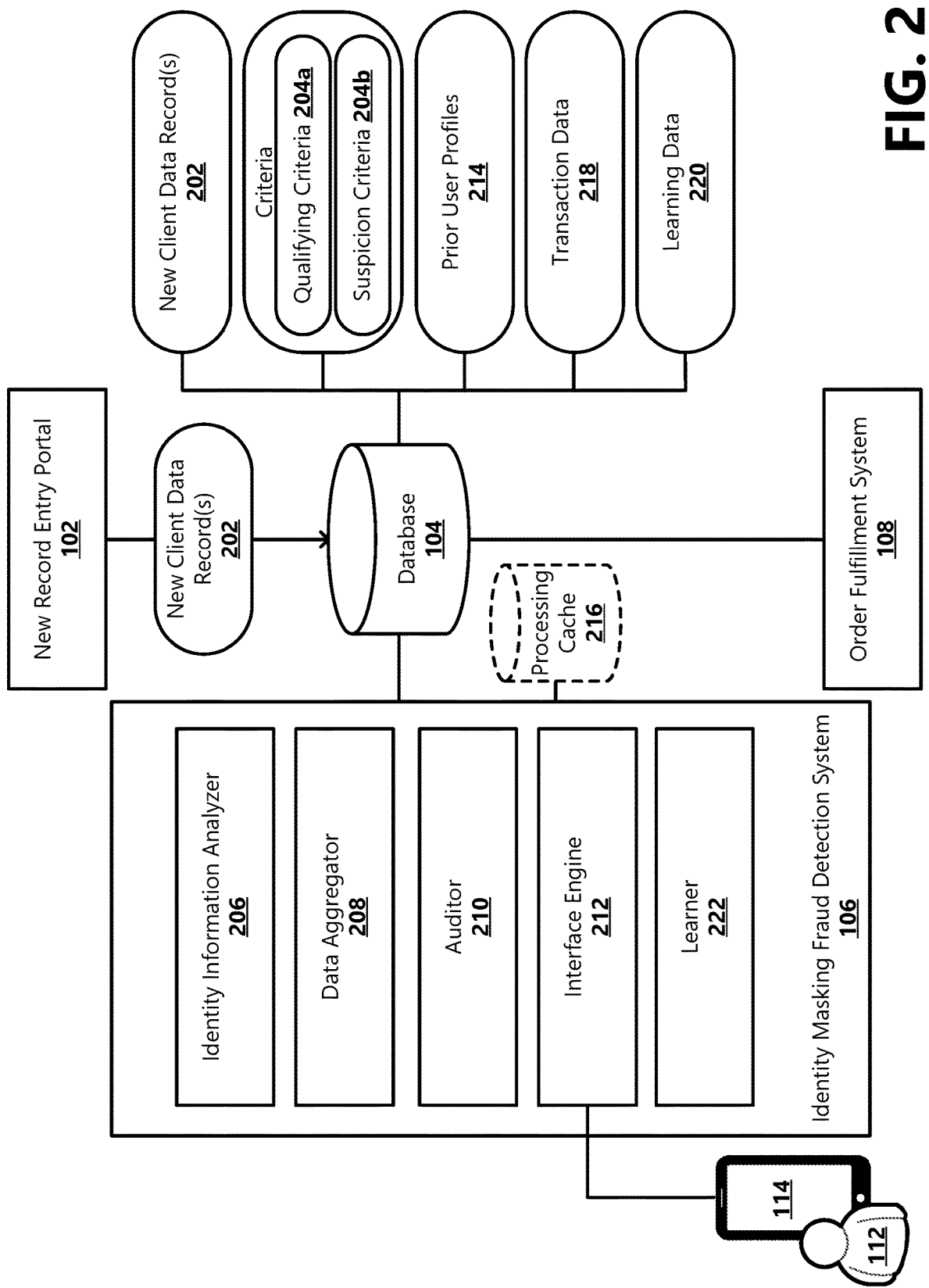
FIG. 2 is a block diagram of components of an example embodiment of an identity masking fraud detection system.

With reference now to FIG. 2, a block diagram showing components of an example embodiment of the identity masking fraud detection system 106 is illustrated. According to an aspect, the identity masking fraud detection system 106 comprises an identity information analyzer 206, a data aggregator 208, an auditor 210, an interface engine 212, and a learner 222. The identity information analyzer 206 is illustrative of a software application, module, or computing device that is operative or configured to access a new client data record 202 stored in the database 104 and analyze identity information included in the new client data record with identity information associated with prior client user profiles 214 for identifying potential suspicious activity. For example, identity information included in a new client data record 202 can include personal identifying information such as, but not limited to, a client user's name (e.g., first name, middle name, middle initial, last name, title, honorific, nickname), address(es) (e.g., billing address, service address), phone number(s) (e.g., home phone, work phone, mobile phone, service-related contact number), employer name, social security number, a portion of the user's social security number (e.g., last four digits), email address(es), drivers license number or other state-issued identification number, financial account number (e.g., credit card number, debit card number), account login information (e.g., username, login identifier (ID), PIN number, password), etc. As should be appreciated, other types of identity information are possible and are within the scope of the present disclosure. Further, a new client data record 202 can include additional information other than identity information, such as information collected as part of a request to establish an account with the service provider (e.g., a selection or specification of services to which the client user desires to subscribe). The new client data record 202 can be created by the new record entry portal 102 responsive to receiving personal identifying information corresponding to a request to subscribe to services provided by the service provider associated with the service provider system 110.

According to an aspect, the identity information analyzer 206 parses the new client data record 202 for personal identifying information variables or attributes and compares particular personal identifying information variables or attributes against personal identifying information associated with prior client user profiles 214 stored in the database 104.

According to an aspect, a prior client user profile 214 can be a user profile of an existing client user or a previous client user of the provider, wherein an existing client user profile includes personal identifying information relating to an existing client user, and a previous client user profile includes personal identifying information relating to a previous client user. In various implementations, the database 104 is configured to store vast amounts (e.g., millions, tens of millions, hundreds of millions) of prior client user profiles 214. According to examples, an existing user profile or a previous user profile can include personal identifying information such as, but not limited to, a client user's name (e.g., first name, middle name, middle initial, last name, title, honorific, nickname), address(es) (e.g., billing address, service address), phone number(s) (e.g., home phone, work phone, mobile phone, service-related contact number), employer name, social security number, email address(es), drivers license number or other state-issued identification number, financial account number (e.g., credit card number, debit card number), account login information (e.g., username, login identifier (ID), PIN number, password), household user profile names (e.g., television or video subscription account usernames, Internet service account usernames), etc. As should be appreciated, other personal identifying information are possible and are within the scope of the present disclosure. Further, an existing user profile or a previous user profile can include information in addition to personal identifying information. As should be appreciated, when comparing particular personal identifying information attributes against personal identifying information associated with prior client user profiles 214 stored in the database 104, the identity information analyzer 206 is operative or configured to compare billions of attribute or sub-attribute variations. According to an aspect, the identity information analyzer 206 is operative or configured to efficiently identify exact and fuzzy attribute matches in a short time span, which enables the provider system 110 to advantageously catch fraudulent activity prior to an expenditure of provider resources (e.g., prior to expending order fulfillment system 108 processing resources, manpower resources, or equipment resources associated with scheduling work orders and sending a technician to set up services for a user fraudulently masking himself/herself to avoid paying owed amounts).

When the identity information analyzer 206 compares particular personal identifying information variables or attributes in a new client data record 202 against personal identifying information of prior client user profiles 214 stored in the database 104, the identity information analyzer 206 is operative or configured to utilize one or a combination of matching methods. According to an aspect, particular matching methods can be applied to particular personal identifying information attributes, match scores are calculated based on a particular scoring method for a particular attribute (and/or sub-attribute), and match scores of a particular attribute are evaluated based on a particular threshold for that attribute, wherein one or more of the selection of attributes to match, matching methods, scoring methods, and match score thresholds can be configured based on learning data analyzed by a machine learning learner 222 component.

In various implementations, the identity information analyzer 206 matches particular attributes of a new client data record 202 against attributes of a prior client user profile 214 using fuzzy logic with varying level of accuracy settings. Fuzzy logic matching methods are used to identify matches between datasets that may be less than 100% perfect, such as when finding correspondences between personal identifying information attributes of a new data record 202 and personal identifying information attributes of prior client user profiles 214 in the database 104. For example, in matching some personal identifying information attributes, the identity information analyzer 206 is configured to match attributes with variations of the attributes, wherein the variations may be intentional or unintentional and can include variations such as typographical error variations, phonetic spelling variations, name variations, initials, nickname variations, missing word component variations, missing spaces variations, truncated name component variations, and language variations.

Fuzzy logic methods can include one or a combination of matching methods, such as a common key method (e.g., using a phonetic algorithm to index names/words by sound that can be matched against other names/words that sound similar but may have differences in spelling), a list method (e.g., using an algorithm to generate spelling or numeric variations of certain attributes that can be matched against known attribute variants (e.g., Amy: Aimee, Amie, Ami)), an edit distance method (e.g., using the Levenshtein distance algorithm, the Damerau-Levenshtein distance algorithm, the Jaro-Winkler distance algorithm, or the Jaccard similarity coefficient) that measures the character-to-character distance (match score) between two attributes by determining a number of similar characters and/or a number of edit operations (e.g., insert, delete, or transpose) to transform one string into the other, and a statistical similarity method (e.g., using a statistical model that can be trained on a large volume of matching attribute pairs to recognize what two 'similar attributes' look like for analyzing two attributes (from a new client data record 202 and a prior client user profile 214) and assigning a similarity or match score). Alternatively or additionally, other known fuzzy matching methods may be used.

According to an aspect, the identity information analyzer 206 is operative or configured to compare varying sets of attributes for identifying potential suspicious activity. The term 'potential suspicious activity' as used herein is used to describe a situation where identity information associated with a new client user 112 corresponds to identity information associated with a prior client user. When identity information associated with a new client user 112 corresponds to identity information associated with a prior client user, the new client data record 202 can be determined to be potentially suspicious due to a possibility that the new client user 112 may be masking his/her identity to conceal that he/she is a prior client user with unresolved transactions (i.e., unsettled obligations, debts) with the provider.

In some implementations, in determining whether identity information associated with a new client user 112 corresponds to identity information associated with a prior client user, the identity information analyzer 206 first compares a qualifying criterion or a set of qualifying criteria 204a (i.e., one or more particular attributes used by the identity masking fraud detection system 106 to make matching decisions) of the new client data record 202 against prior client user profiles 214 (existing user profiles and previous user profiles) to determine one or more qualifying user profiles. For example, the identity information analyzer 206 may be operative or configured to query the database 104 for prior client user profiles 214 that match (e.g., exact and/or fuzzy match) the qualifying criterion/criteria 204a (based on whether match scores for the attribute(s) corresponding to the qualifying criterion/criteria meet a particular threshold), wherein prior client user profiles 214 that match the qualifying criterion/criteria based on a threshold are identified as qualifying user profiles. In various implementations, the qualifying criterion 204a or set of criteria and/or the threshold are configurable (e.g., manually and/or based on machine learning). For example, the qualifying criteria 204a and/or thresholds can be initially set, and can be adjusted based on collected learning data 220 (as described below).

Figure 3:
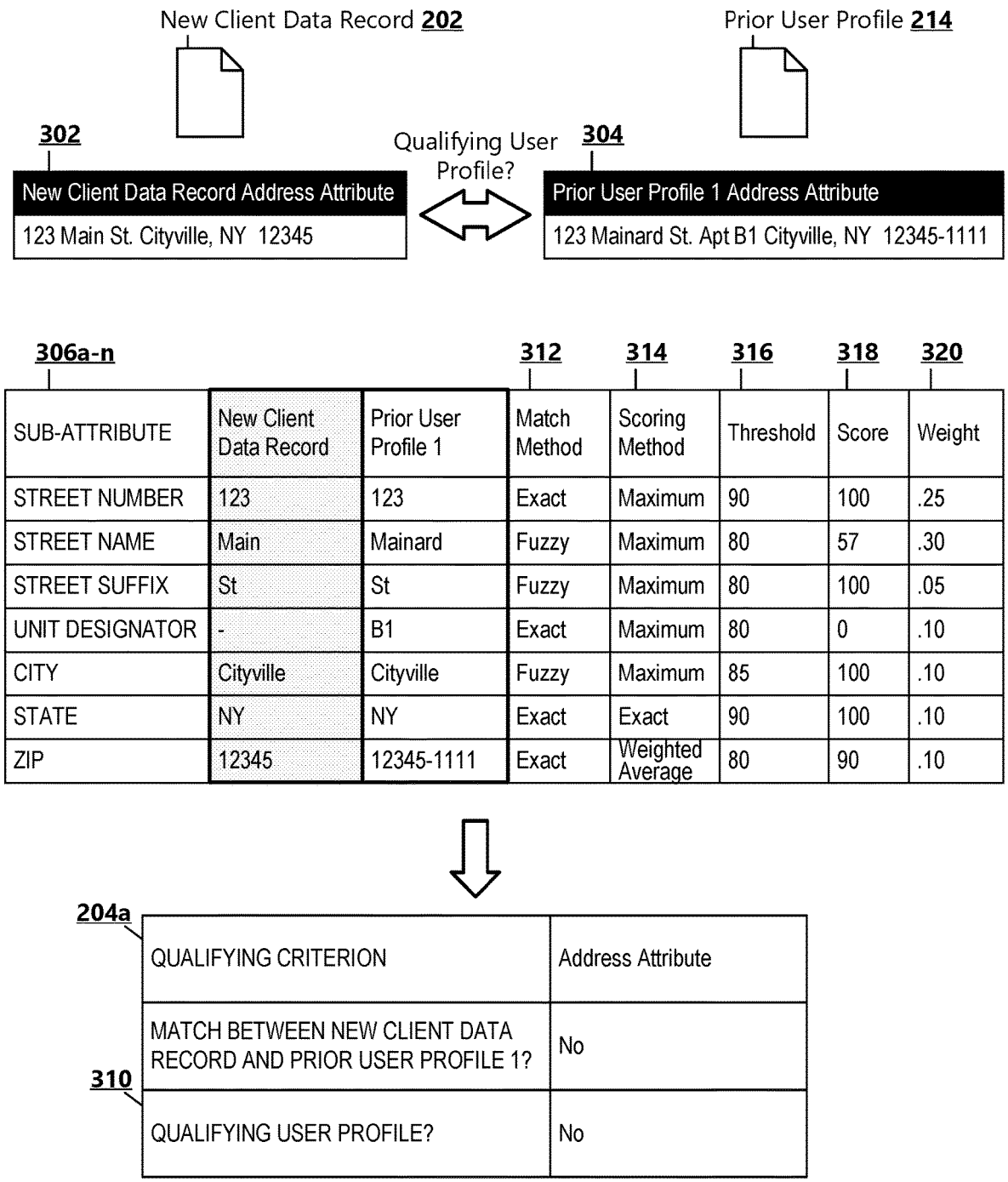
FIG. 3 illustrates an example of comparing an attribute of a new client data record to an attribute of a prior client user profile based on a qualifying criterion or a set of qualifying criteria to identify suspicious user profiles.

According to one example and as illustrated in FIG. 3, a qualifying criterion 204a for identifying qualifying user profiles 310 is an exact match or a fuzzy match of a home or service address attribute 302,304, wherein existing user profiles or previous user profiles that match the address attribute (based on match scores and a threshold for the address attribute) are flagged as qualifying user profiles. An attribute of a new client data record 202 can be matched against an attribute of prior client user profile 214 stored in the database 104, wherein a match score for the attribute may have a particular (automatically or manually configurable) weight. For example, a match of an email address attribute may be weighted higher than a match of a name attribute. According to an aspect, weights can be configurable based on a learned optimization of the fraud detection system 106 for detecting new account fraud.

In some implementations, an attribute, such as an address attribute 302,304 is broken into sub-attributes 306a-n (generally 306) and is compared by those sub-attributes, wherein a particular matching method 312, match scoring method 314, and threshold 316 are associated with each sub-attribute 306, and sub-attribute scores 318 are evaluated (e.g., based on sub-attribute match score and weight 320) to calculate a score for the address attribute as a whole. For example, an address attribute 302,304 can be broken into a street number sub-attribute, a street name sub-attribute, a street suffix sub-attribute, a unit designator sub-attribute (e.g., suite number, apartment number), a city sub-attribute, a state sub-attribute, and a ZIP code sub-attribute, wherein each sub-attribute 306 of a new client data record 202 is matched against sub-attributes of address attributes 304 of prior client user profiles 214 stored in the database 104 and wherein the match score 318 for each sub-attribute 306 has a particular (automatically or manually configurable) weight 320. As mentioned above, the database 104 can store vast numbers of prior client user profiles 214 (e.g., millions+). Further, the identity masking fraud detection system 106 may process large numbers of new client data records 202. As can be appreciated, in utilizing one or more fuzzy processing matching methods for comparing various attributes 302,304 and sub-attributes 306, billions of combinations of characters are analyzed. Accordingly, the identity information analyzer 206 is operative or configured to detect new account identity masking fraud via an analysis of a massive amount of data in a shortened time period (e.g., between the time of receipt of a new client data record 202 to prior to scheduling or prior to fulfilling a work order for the new client data record).

According to an aspect, match scores of matched attributes 304 are evaluated to calculate a match score for a prior client user profile 214 as a whole, wherein a match between a new client data record 202 and a prior client user profile 214 is based on whether the match score for the prior client user profile satisfies a predetermined and configurable threshold. In some implementations, qualifying user profiles 310 are flagged, and any additional analysis and matching processes in association with the new client data record 202 are performed only against the flagged (qualifying) user profiles. In some implementations, copies of qualifying user profiles 310 are stored in a processing cache 216, where additional analysis and matching processes in association with the new client data record 202 are performed in association with the qualifying user profile copies stored in this cache 216. According to examples, by using the processing cache 216 for performing additional analyses and matching processes, long-term storage is not required, which can improve the efficiency of the identity masking fraud detection system 106. As should be appreciated, other qualifying criteria 204a can be used by the identity information analyzer 206. For example, in a market-based solution, qualifying criteria 204a can include a match of three or more attributes, including a name attribute, within a same market or geographic area. Other qualifying criteria 204a are possible and are within the scope of the present disclosure.

Figure 4:
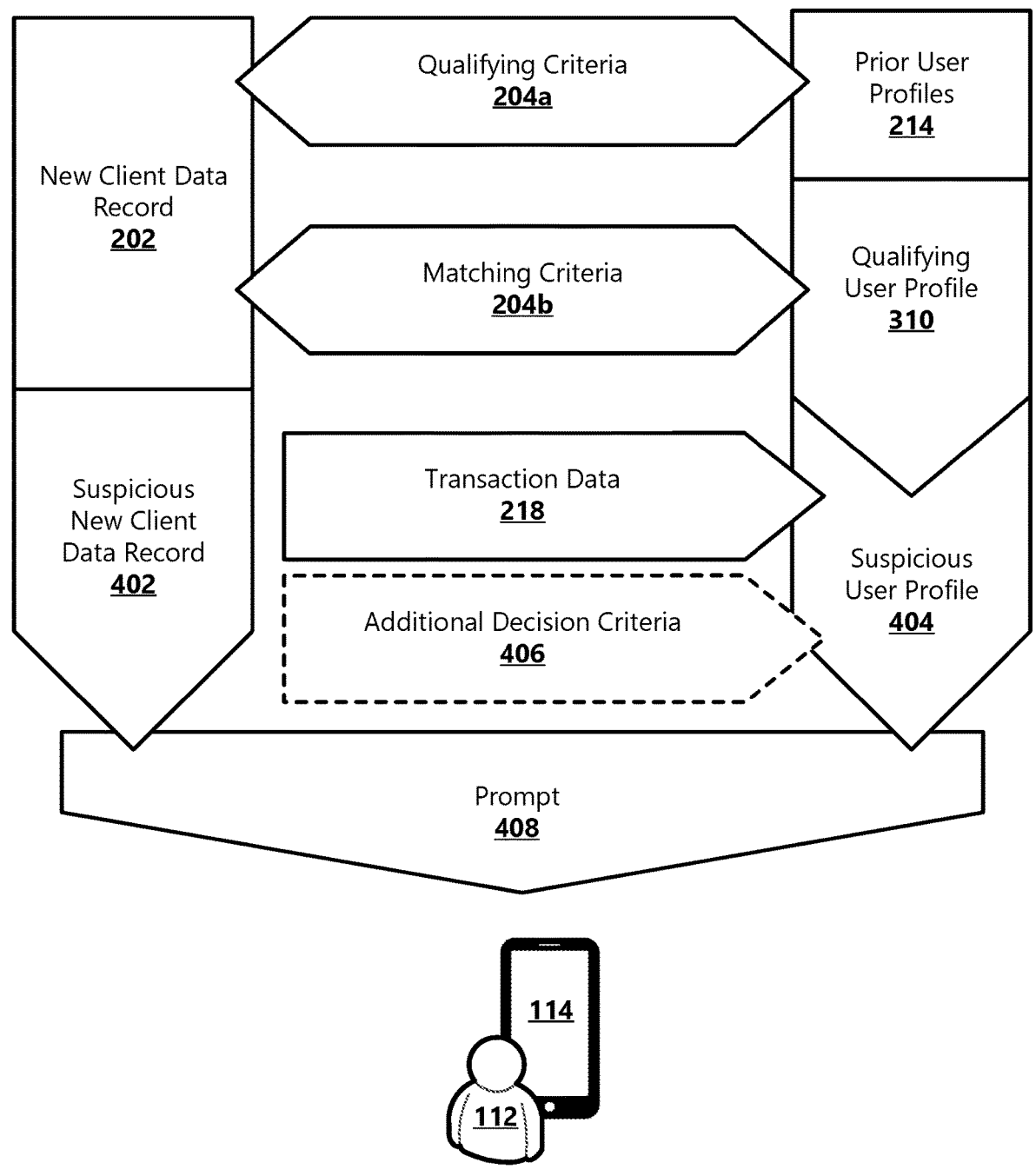
FIG. 4 is a block diagram that illustrates a high-level overview of a method of verifying personal identifying information of a new user according to an embodiment

As illustrated in FIG. 4, when a new client data record 202 is matched with one or more prior client user profiles 214 based on matching a qualifying criterion 204a or a set of qualifying criteria 204a, the one or more matching prior client user profiles are identified as qualifying user profiles 310. According to an aspect, the identity information analyzer 206 is further operative or configured to determine whether the new client data record 202 further corresponds with at least one of the one or more qualifying user profiles 310 based on a configurable set of suspicion criteria 204b. That is, in determining whether identity information associated with a new client user 112 corresponds to identity information associated with a prior client user, the identity information analyzer 206 compares the new client data record 202 against the one or more qualifying user profiles 310 using a set of suspicion criteria 204b (i.e., a set of particular attributes used by the identity masking fraud detection system 106 to form matching decisions) to determine whether the new client data record is suspicious. For example, a new client data record 202 is determined to be suspicious or potentially suspicious when the suspicion criteria 204b are satisfied (e.g., the new client data record 202 matches a qualifying user profile 310 based on the suspicion criteria and a threshold).

For example, the identity information analyzer 206 may be operative or configured to query flagged prior client user profiles 214 (i.e., qualifying user profiles 310) in the database 104 or qualifying user profiles 310 in the processing cache 216 for particular attributes that match (e.g., exact and/or fuzzy match) the related attributes (e.g., name attribute matches name attribute, phone number attribute matches phone number attribute) of the new client data record 202 utilizing one or a combination of matching methods 312. According to an aspect, particular matching methods 312 can be applied to the personal identifying information attributes 302,304 corresponding to the suspicion criteria 204b, and match scores 318 are calculated based on a particular scoring method 314 for a particular attribute (and/or sub-attribute), and match scores of a particular attribute are evaluated based on a particular threshold 316 for that attribute (e.g., does the match score for a particular attribute satisfy the threshold 316 for that attribute for being identified as a match). In some examples, the identity information analyzer 206 matches suspicion criteria-associated attributes 302 of a new client data record 202 against corresponding attributes 304 of a qualifying user profile 310 using fuzzy logic with varying levels of accuracy settings. Qualifying user profiles 310 that match the new client data record 202 based on the suspicion criteria 204b are identified as suspicious user profiles 404, and the associated new client data record 202 is also identified as suspicious (i.e., a suspicious new client data record 402). That is, the new client data record 202 and the corresponding (matching) prior client user profile 214 are flagged as suspicious as potentially being associated with new account fraud, in particular, identity masking.

According to one example, suspicion criteria 204b for identifying a suspicious new client data record 402 and at least one associated suspicious user profile 404 can comprise an exact match or a fuzzy match of a name attribute 302,304 or an exact match or a fuzzy match of two or more attributes other than a name attribute match. For example, a new client data record 202 and a qualifying user profile 310 may be determined to be suspicious when a name attribute 302 of the new client data record is determined to match a name attribute 304 of the qualifying user profile using one or a combination of matching methods 312 (e.g., exact matching, fuzzy matching) and scoring methods 314. As another example, a new client data record 202 and a qualifying user profile 310 may be determined to be suspicious when a match is found between at least two of the following attributes 302,304 in the new client data record and the qualifying user profile 310: a phone number attribute (e.g., home number, mobile number, work number, service contact number), an email address attribute, a full or partial social security number attribute, and a login information attribute (e.g., user ID, password, pin number). According to an aspect, an attribute 302,304 can be matched based on an exact matching method or on one or a combination of fuzzy matching methods with varying levels of accuracy settings. As should be appreciated, other suspicion criteria 204b can be used by the identity information analyzer 206. For example, in a market-based solution, suspicion criteria 204b may require a match of a name attribute plus at least two additional attribute matches. Other suspicion criteria 204b are possible and are within the scope of the present disclosure.

According to an aspect, when identity information associated with the new client user 112 corresponds to identity information associated with a prior client user profile 214 based on the qualifying criteria 204a and suspicion criteria 204b, the identity information analyzer 206 flags the new client data record 202 and the associated prior client user profile 214/qualifying user profile 310 as suspicious. In some implementations, the identity information analyzer 206 communicates a message to the data aggregator 208 about the suspicious new client data record 402 and the corresponding suspicious user profile 404. In other implementations, the identity information analyzer 206 passes the suspicious new client data record 402 and the corresponding suspicious user profile 404 to the data aggregator 208. With reference again to FIG. 2, the data aggregator 208 is illustrative of a software application, module, or computing device that is operative or configured to aggregate data for performing additional processes associated with detecting fraudulent activity related to identity masking. According to an aspect, the data aggregator 208 queries the database 104 for transaction data 218 associated with the suspicious user profile 404 (e.g., query by client user name, username, account number). For example, the database 104 may comprise or be communicatively attached to a billing system and may store billing data for services and products subscribed to by prior client users (e.g., existing users and previous customers) of the provider. According to an aspect, the transaction data 218 includes data (e.g., an amount owed, equipment due) relating to unresolved transactions (e.g., past due debts with the provider, unreturned equipment) between the prior client user and the provider.

In some examples, the suspicious user profile 404 is associated with an account number/ID, and the data aggregator 208 uses that account number/ID to query the database 104 for transaction data 218 (billing data) associated with the suspicious user profile 404. In other examples, the data aggregator 208 uses another attribute to query the database 104 for transaction data 218 (billing data) associated with the suspicious user profile 404. The data aggregator 208 is further operative to aggregate the suspicious new client data record, the corresponding suspicious user profile 404, and the transaction data 218 associated with the suspicious user profile. The data aggregator 208 is further operative or configured to make the aggregated data available to the auditor 210.

The auditor 210 is illustrative of a software application, module, or computing device that is operative or configured to determine whether there are any unresolved transactions associated with the suspicious user profile 404. For example, the auditor 210 can audit or analyze one or more pieces of the aggregated data associated with the suspicious activity (e.g., the suspicious new client data record, the corresponding suspicious user profile 404, and the transaction data associated with the suspicious user profile) and determine whether the suspicious user profile 404 is associated with an unpaid balance. In some examples, the determination is based on whether a particular matched attribute 304 (e.g., address attribute, name attribute) of the suspicious user profile 404 is associated with an unpaid balance. The particular attribute or attributes 304 that are used to identify an unresolved transaction can be manually or automatically configurable. For example, a particular attribute may be selected based on learned data 220 (as will be described below).

According to some implementations, the auditor 210 is further operative or configured to apply additional decision criteria 406 to one or more pieces of the aggregated data (e.g., the suspicious new client data record, the corresponding suspicious user profile 404, and the transaction data associated with the suspicious user profile) for further validating that the new client user 112 is associated with the suspicious user profile 404 (e.g., that the new client user 112 is a prior client user/customer of the provider). In some examples, the auditor 210 is operative or configured to communicate with (e.g., make a request to, make an Application Programming Interface (API) call to, communicate with via a user agent operating on the provider system 110) an external data source 116 that is embodied as a tool that is operative to search for particular information associated with the new client user 112 and or the prior client user associated with the suspicious user profile 404 (e.g., based on a name attribute and/or a social security number attribute) and return meaningful data, such as aliases, date of birth, previous and current addresses, social security numbers, previous and current phone numbers, dates lived at address, associated personal identifying information, etc. The auditor 210 is further operative or configured to match one or more pieces of the returned data with one or more attributes 302,304 of the suspicious user profile 404 and/or the suspicious new client data record 402 using one or a combination of matching methods 312 and match scoring methods 314.

As an example, a particular suspicious new client data record 402 may comprise two attributes 302 that are determined, by the identity information analyzer 206, to match two attributes 304 of a particular suspicious user profile 404, wherein neither of the two matching attributes is a name attribute. Further, the auditor 210 may request and receive data from an external data source 116 that matches the new client user's name (name attribute 302 from the suspicious new client data record 402) with alternate names used by the new client user. The auditor 210 may further match one of the alternate names with the name attribute 304 from the suspicious user profile 404, and therefore further validate that the new client user 112 is associated with the suspicious user profile 404. In some implementations, this additional match and validation increments the match score of the suspicious user profile 404. For example, a higher match score is indicative of a more likely match. This match score can be a confidence level of the match between the new client user 112 and the corresponding suspicious user profile 404

In some examples, the auditor 210 is operative or configured to communicate with (e.g., make a request to, make an Application Programming Interface (API) call to, communicate with via a user agent operating on the provider system 110) an external data source 116 embodied as a social security number verification service. For example, the auditor 210 can provide a name attribute 302,304 and a social security number attribute to the external data source 116, and request for verification that the provided name matches the provided social security number. The name attribute 302,304 may be a name attribute from a suspicious new client data record 402 or from a suspicious user profile 404, and the social security number attribute can likewise be a social security number attribute from a suspicious new client data record 402 or from a suspicious user profile 404. The external data source 116 may return a 'yes' or 'no' answer indicating whether the provided name matches the name associated with the social security number in the Social Security's records. In some examples, the external data source 116 is further operative to return a death indicator if the Social Security's records show that the person associated with a provided social security number is deceased. According to an aspect, the auditor 210 is able to receive a response from the external data source 116 and to use the contents of the response to either validate that the new client user 112 is who he/she says he/she is (e.g., when the new client user's name and social security number are verified with the external data source) or to flag the suspicious new client data record 402 as potentially fraudulent (e.g., when the new client user's name does not match the social security number attribute in the new client data record 202/suspicious new client data record 402, when a death indicator is received in association with the social security number attribute in the new client data record). In some examples, an external data source 116 is embodied as a report of social security numbers that are associated with deceased individuals, and this report can be queried by the auditor 210 for a social security number matching the social security number attribute in the new client data record 202/suspicious new client data record 402.

In some implementations, the auditor 210 is operative or configured to perform internal audit processes. For example, the auditor 210 can query the database 104 for a particular attribute (e.g., a social security number provided in new client data record 202/suspicious new client data record 402) to determine whether the particular attribute exists in the database. As an example, if a particular social security number is found more than N times (where N is an automatically or manually configurable number) in the database 104, the auditor 210 may flag the new client data record 202/suspicious new client data record 402 as potentially fraudulent (potential identity masking). In some examples, if a work order has already been scheduled for providing services or equipment to the new client user 112, the auditor 210 is operative or configured to communicate a stop work order request to the order fulfillment system 108 to cancel the pending work order. In other examples, if a work order has not already been scheduled, the auditor 210 is operative or configured to hold or flag the corresponding new client data record 202 to prevent the record from being passed to or pulled by the order fulfillment system 108.

In some examples, the auditor 210 is operative or configured to compare the suspicious new client data record 402 with the corresponding suspicious user profile 404 using additional metrics, such as financial information (e.g., credit card numbers, bank account numbers), place of employment, business address, business telephone number, demographic information, or household user names (e.g., television or video subscription account usernames, Internet service account usernames). When additional matches are identified, the auditor 210 can increment the match score of the suspicious user profile 404. As should be appreciated, the auditor 210 may audit the suspicious new client data record 402 and/or the corresponding suspicious user profile 404 using additional or alternative metrics. In some examples, an additional manual audit may be performed.

According to an aspect, when a suspicious new client data record 402 is determined to match a suspicious user profile 404 that includes unresolved transactions, the interface engine 212, illustrative of a software application, module, or computing device, is operative or configured to generate and transmit a prompt 408 or communication to a client user device 114 prompting the new client user 112 to resolve the unresolved transactions or to validate that the new client user 112 is not associated with the suspicious user profile 404. According to another aspect, when a suspicious new client data record 402 is flagged as potentially fraudulent (e.g., as being a new account request associated with someone who is potentially masking his/her identity), the interface engine 212 is operative or configured to generate and transmit a prompt 408 or communication to a client user device 114 prompting the new client user 112 to validate that the user is who he/she says he/she is (e.g., provide one or more forms of identification as determined acceptable by the provider). The prompt 408 can be embodied as one of various types of communications, such as an email, a text message, a notification or alert, a phone call, etc. In some examples, the interface engine 212 is operative to parse one or more contact information-related attributes (e.g., a phone number, an email address, a username) from the suspicious new client data record 402, and use the one or more contact information-related attributes as a recipient address of a communication including the prompt 408.

In some examples, the prompt 408 includes information about the detected suspicious activity, such as information about an unresolved transaction (e.g., an amount owed, a piece of equipment due). In other examples, the prompt 408 notifies the new client user 112 that additional identification information is required to verify his/her identity. The prompt 408 may include a list of acceptable forms of identification. In some examples, the prompt 408 includes a link to a webpage associated with the provider system 110, wherein the webpage includes a file upload field that enables the new client user 112 to log in to his/her account and upload a file (e.g., identification information) to the database 104 that can be evaluated by the auditor 210 to verify that the new client user is who he/she says he/she is. In some examples, the prompt 408 and/or the webpage associated with the provider system 110 includes an option that enables the new client user 112 to make an online payment to the provider system 110 (e.g., for resolving unresolved transactions). In other examples, the new client user 112 may call the provider or go to a provider office location to provide identification information to validate the user or payment to resolve an unresolved transaction. In some examples, the interface engine 212 is operative or configured to generate and transmit a prompt 408 or communication to an administrative user associated with the provider system 110, wherein the administrative user can contact the new client user 112 to prompt the user to resolve an unresolved transactions or to validate that the user is who he/she says he/she is.

In various implementations, feedback associated with a new client user 112 providing additional information that validates that he/she is not associated with a suspicious user profile 404 and feedback associated with a new client user resolving an unresolved transaction in association with a suspicious user profile identified as corresponding to the new client user are input into the database 104 and are stored as learning data 220. Additionally, data associated with matching and decision processes (e.g., data used for making matching decisions, attributes analyzed, decisions made) are stored in the database 104 as learning data 220. According to an aspect, the identity masking fraud detection system 106 is a machine learning system that comprises a learner 222 component. The learner 222 is illustrative of a software application, module, or computing device operative or configured to execute a machine-learning algorithm against learning data 220 to generate (i.e., learn) matching rules (e.g., qualifying criteria 204a, suspicion criteria 204b, match methods 312, scoring methods 314, threshold 316 values, size of dataset to access and analyze) that can be understood and used by the identity information analyzer 206 and the auditor 210 to analyze and make decisions corresponding to efficiently and accurately identifying potential new account fraud.

The learning data 220 can include training data input into the learner 222 and historical data collected from past analyses and decisions made by the identity information analyzer 206 and the auditor 210 and end results associated with those decisions. For example, the historical data can include positive examples that indicate when a desired result has been achieved (e.g., when a new client data record 202 is determined to be suspicious and when an unresolved transaction is found in association with a suspicious user profile 404 identified as corresponding to the new client data record) and negative examples that indicate when a desired result has not been achieved (e.g., when a new client data record 202 is determined to be suspicious but the new client user 112 associated with the new client data record 202 provides additional information that validates that he/she is not associated with a suspicious user profile 404 identified as corresponding to the new client data record). According to an aspect, the learning data 220 are used by the learner 222 to discover and generate new matching rules (e.g., qualifying criteria 204a, suspicion criteria 204b, match methods 312, scoring methods 314, and/or threshold 316 values) and to measure the accuracy and effectiveness of the rules once they have been learned and implemented. While a variety of operational components are described with respect to the identity masking fraud detection system 106, it should be appreciated that additional or fewer components may be employed and/or components and associated functionalities can be distributed throughout the network 118.

Figure 5:
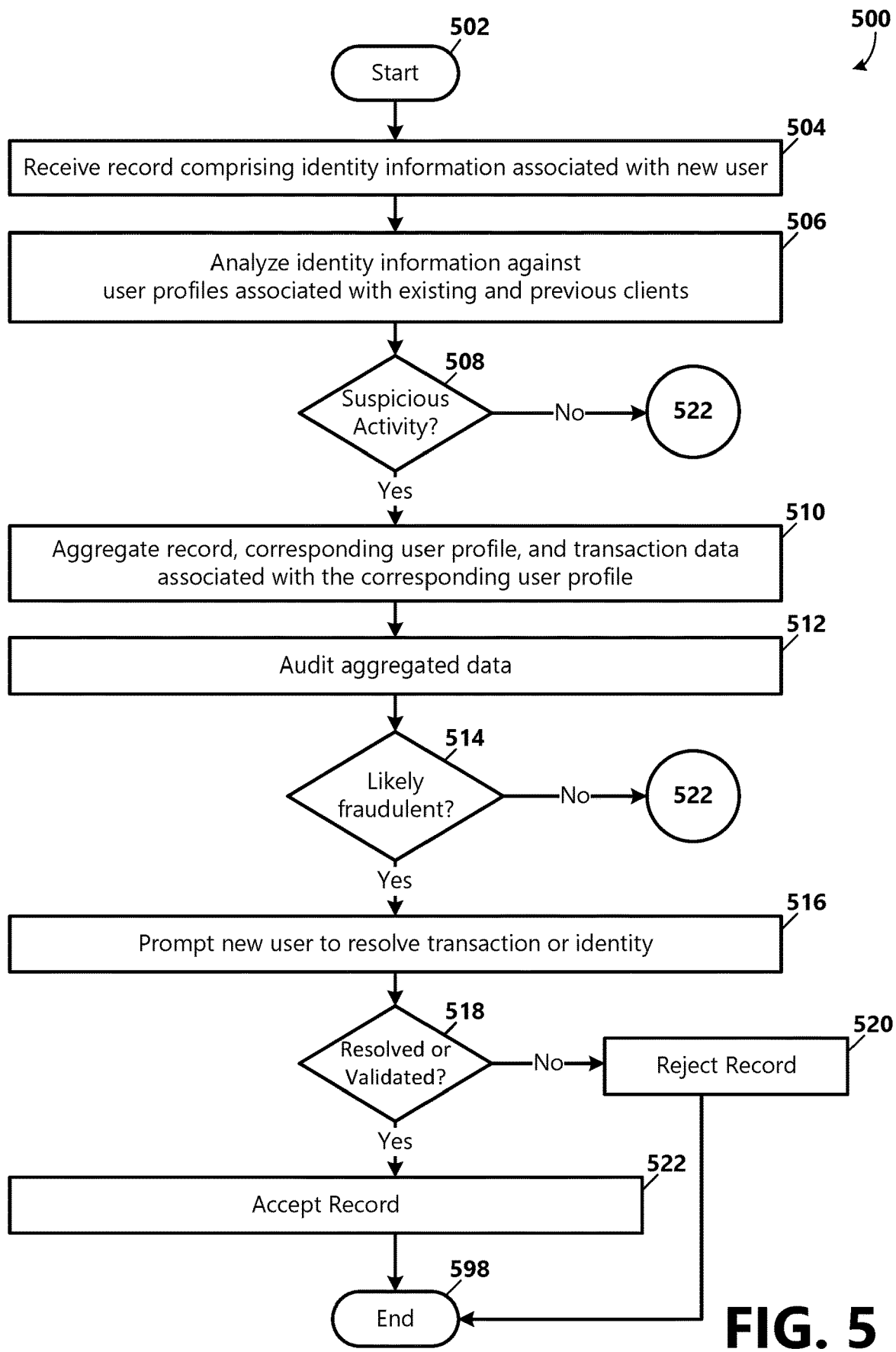
FIG. 5 is a flow diagram depicting general stages of an example process for verifying personal identifying information of a new user according to an embodiment.

FIG. 5 is a flow diagram that depicts general stages of an example method 500 for verifying personal identifying information of a new client user 112 according to an embodiment. The method 500 begins at START OPERATION 502, and proceeds to OPERATION 504 where a new client data record 202 is received. For example, the new client data record 202 includes personal identifying information (e.g., name, address, phone number(s), social security number, email address(es), account login information, government-issued identification number, financial account number) of a new client user 112 and corresponds to a request to subscribe to services provided by a service provider associated with the service provider system 110.

At OPERATION 506, the method 500 uses the identity information analyzer 206 to access prior client user profiles 214 stored in the database 104. In some examples, the identity information analyzer 206 accesses prior client user profiles 214 associated with current client users and previous client users from a last N years, wherein N is a manually configurable or automatically configurable (e.g., based on machine learning) number. As described above, the prior client user profiles 214 include identity information relating to existing and previous client users of the service provider.

The method 500 further uses the identity information analyzer 206 to analyze attributes of the new client data record 202 with the accessed prior client user profiles 214, wherein the analysis uses one or a combination of exact or fuzzy matching methods 312 and scoring methods 314 to compare and match particular attributes 302 of the new client data record to particular attributes 304 of one or more prior client user profiles. The particular matching methods 312, scoring methods 314 and qualifying criterion 204a used to identify matches are learned and implemented via machine learning algorithms that are configured to increase the accuracy and efficiency of identifying fraudulent users (i.e., users masking their identities in an attempt to defraud a provider). Based on one or more qualifying criteria 204a, the identity information analyzer 206 calculates and evaluates match scores 318 against manually or automatically configured thresholds 316 to determine whether particular attributes 302,304 of the new client data record 202 and a prior client user profile 214 match, thus indicating possible suspicious activity and qualifies the prior client user profile for additional analysis. Additionally at OPERATION 506, the method 500 uses the identity information analyzer 206 to further analyze (e.g., compare and match based on one or a combination of matching methods 312) one or more attributes 302,304 of the new client data record and the corresponding qualifying prior client user profile 310. For example, the identity information analyzer 206 analyzes particular attributes of the new client data record and the corresponding qualifying prior client user profile based on a set of suspicion criteria 204b. According to an aspect, the particular matching methods 312 and suspicion criteria 204b are learned and/or tuned and implemented via machine learning algorithms.

At DECISION OPERATION 508, the method 500 uses the identity information analyzer 206 to make a determination as to whether suspicious activity is detected. For example, the determination can be based on whether one or more attributes 302,304 (e.g., selected based on a set of suspicion criteria 204b) of the new client data record 202 and the corresponding qualifying prior client user profile 310 match according to calculated match scores 318 and thresholds 316. These match scores 318 and thresholds 316 can be learned and/or tuned and implemented via machine learning algorithms.

When a match is identified, at OPERATION 510, the method 500 uses the data aggregator 208 to aggregate the new client data record 202, the one or more suspicious prior client user profiles 404 (i.e., prior client user profiles 214 that comprise attributes 304 that match the new client data record according to the one or more suspicion criteria 204b), and transaction data 218 associated with the one or more suspicious prior client user profiles 404. In some examples, the data aggregator 208 temporarily stores the aggregated data (i.e., copies of the aggregated data) in a processing cache 216 while the auditor 210 performs auditing processes.

At OPERATION 512, the method 500 uses the auditor 210 to analyze the transaction data 218 associated with the one or more suspicious user profiles 404 for locating unresolved transactions, for example, unsettled debts or unreturned equipment due to the provider. In some implementations, the auditor 210 applies additional decision criteria 406 to one or more pieces of the aggregated data (e.g., the suspicious new client data record, the corresponding suspicious user profile 404, and the transaction data associated with the suspicious user profile) for further validating that the new client user 112 is associated with the suspicious user profile 404 (e.g., that the new client user 112 is a prior client user/customer of the provider). The auditor 210 may communicate with one or more external data sources 116 for accessing additional data as additional decision criteria 406 to determine whether the new client user 112 is associated with the suspicious user profile 404. In some examples, the additional data may increment or decrement a match score between the suspicious new client user record 402 and the suspicious user profile 404. For example, if the address of the new client data record 202 matches an address of the suspicious user profile 404 and the additional data indicate or confirm that the social security number attribute in the suspicious user profile data and the name attribute in the new client data record 202 match the name associated with the social security number in the Social Security's records, the auditor 210 can increment the match score between the new client user 112 and the prior client user associated with the prior client user profile 214/suspicious user profile 404. When this match score satisfies a configurable threshold, the new client data record 202/suspicious new client data record 402 is determined (DECISION OPERATION 514) to be likely fraudulent. In some examples, the additional data may satisfy a criterion for flagging or determining (DECISION OPERATION 514) that the new client data record 202/suspicious new client data record 402 is likely fraudulent. In some examples, a criterion for flagging or determining (DECISION OPERATION 514) that the new client data record 202/suspicious new client data record 402 is likely fraudulent is the detection of an unresolved transaction or unpaid balance. In some examples, this detection is based on whether a particular matched attribute 304 (e.g., address attribute, name attribute) of the suspicious user profile 404 is associated with an unpaid balance. The particular matched attribute 304 can be an attribute that is selected based on machine learning.

When a determination is made that the new client data record 202/suspicious new client data record 402 is likely fraudulent (i.e., that the new client user 112 is likely masking his/her identity), the method 500 uses the interface engine 212 to generate and transmit a prompt 408 to a client user device 114 associated with the new client user 112. For example, the prompt 408 can be embodied as one of various types of communications, such as an email, a text message, a notification or alert, a phone call, etc., and includes a request for the new client user 112 to validate that the user is who he/she says he/she is (e.g., provide one or more forms of identification as determined acceptable by the provider) or to resolve any unresolved transactions.

At DECISION OPERATION 518, the method 500 uses the auditor 210 to determine whether the new client user 112 can be verified (based on feedback from the new client user (e.g., identification information provided by the new client user) or whether an unresolved transaction has been resolved (e.g., receipt of payment to resolve an unresolved transaction). In some examples, the auditor 210 receives a notification when data is received in associated with the new client data record 202/suspicious new client data record 402 or the suspicious user profile 404. In other examples, the auditor 210 queries the database 104 for updates or new postings to the new client data record 202/suspicious new client data record 402. When additional information provided by the new client user 112 satisfies verification criteria (e.g., validates that the user is who he/she says he/she is) and/or good account status criteria (e.g., unresolved transactions have been resolved), at OPERATION 522, the method 500 uses the auditor 210 to accept the new client data record 202. For example, by accepting the new client data record 202, a work order for providing goods and/or services to the new client user 112 can be scheduled. When additional information is not provided by the new client user 112 or when additional information provided by the new client user 112 does not satisfy verification criteria (e.g., validates that the user is who he/she says he/she is) and/or good account status criteria (e.g., unresolved transactions have been resolved), at OPERATION 520, the method 500 uses the auditor 210 to reject the new client data record 202 (e.g., stop work order; continue to hold work order and alert account representative).

As described above, learning data 220 corresponding to matches identified, decisions made, unresolved transactions identified, user feedback/responses received, and work order scheduled are collected and stored in the database 104. The learning data 220 can be used by the identity information analyzer 206 and the auditor 210 to learn matching rules (e.g., qualifying criteria 204a, suspicion criteria 204b, match methods 312, scoring methods 314, threshold 316 values, size of dataset to access and analyze) that can be understood and used by the identity information analyzer 206 and the auditor 210 to analyze and make decisions corresponding to efficiently and accurately identifying potential new account fraud. The method 500 ends at OPERATION 598.

Figure 6:
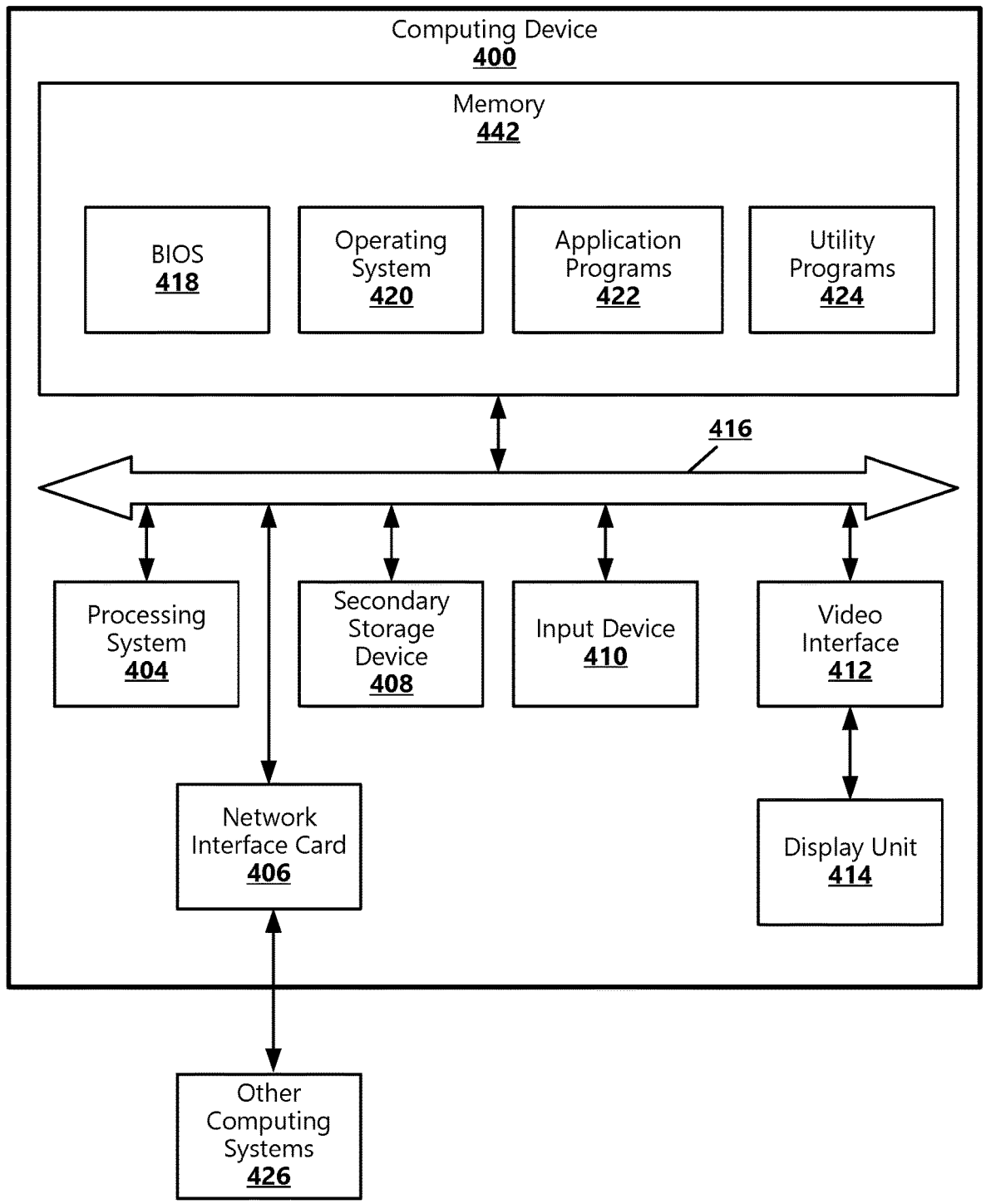
FIG. 6 is a block diagram illustrating example physical components of a computing device or system with which embodiments may be practiced.

FIG. 6 is a block diagram illustrating example physical components of a computing device or system 600 with which embodiments may be practiced. It should be appreciated that in other embodiments, different hardware components other than those illustrated in the example of FIG. 6 may be used. Computing devices may be implemented in different ways in different embodiments. For instance, in the example of FIG. 6, the computing device 600 includes a processing system 604, memory 602, a network interface 606 (wired and/or wireless), radio/antenna 607, a secondary storage device 608, an input device 610, a video interface 612, a display unit 614, and a communication medium 616. In other embodiments, the computing device 600 may be implemented using more or fewer hardware components (e.g., a video interface, a display unit, or an input device) or in combination with other types of computer systems and program modules 626.

The memory 602 includes one or more computer-readable storage media capable of storing data and/or computer-executable instructions. Memory 602 may store the computer-executable instructions that, when executed by processor 604, cause verification of new client user identification. In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface card 606, the secondary storage device 608, the input device 610, and the video interface 612. In different embodiments, the communications medium 616 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs or program code 622 that, when executed by the processing system 604, cause the computing device 600 to provide applications (e.g., the identity masking fraud detection system 106) to users. The memory 602 also stores one or more utility programs 624 that, when executed by the processing system 604, cause the computing device 600 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to, wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figures 7A, 7B:
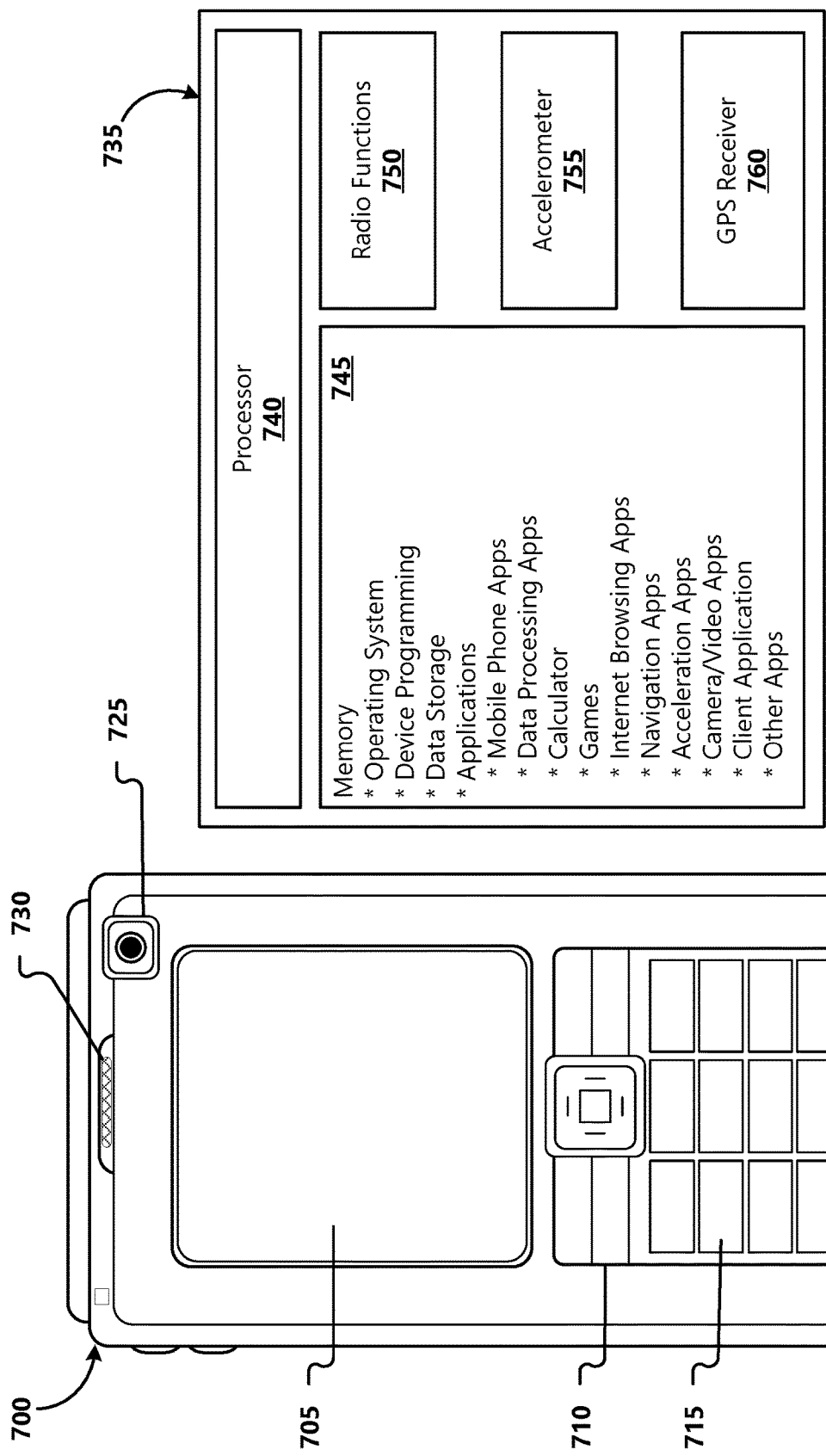
FIGS. 7A and 7B are block diagrams illustrating example physical components of a suitable mobile computing environment with which aspects of the present disclosure can be practiced.

FIGS. 7A-7B illustrate a suitable mobile computing device 700 or environment, for example, a mobile computing device or smart phone, a tablet personal computer, a laptop computer, or other device 114, with which aspects can be practiced. The mobile computing device 700 is illustrative of any suitable device operative to send, receive and process wireless communications. A display screen 705 is operative for displaying a variety of information such as information about incoming and outgoing communications, as well as, a variety of data and displayable objects, for example, text, alphanumeric data, photographs, and the like.

Data input to the mobile computing device 700 can be performed via a variety of suitable means, such as, touch screen input via the display screen 705, keyboard or keypad input via a data entry area 710, key input via one or more selectable buttons or controls 715, voice input via a microphone 718 disposed on the mobile computing device 700, photographic input via a camera 725 functionality associated with the mobile computing device 700, or any other suitable input means. Data can be output via the mobile computing device 700 via any suitable output means, including but not limited to, display on the display screen 705, audible output via an associated speaker 730 or connected earphone system, vibration module for providing tactile output, and the like.

Referring now to FIG. 7B, operational unit 735 is illustrative of internal operating functionality of the mobile computing device 700. A processor 740 is illustrative of a computer processor for processing incoming and outgoing data and communications and controlling operation of the device and associated software applications via a mobile computing device operating system. Memory 745 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 700 can contain an accelerometer 755 for detecting acceleration, and can be used to sense orientation, vibration, and/or shock. Mobile computing device 700 can contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the mobile computing device 700 to communicate with other communication devices and systems via a wireless network. Radio functions 750 can be utilized to communicate with a wireless or WIFI-based positioning system to determine a device location.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

I claim:

1. A system to detect identity masking, the system comprising:
   at least one processor;
   a memory storage that includes:
      a new record entry portal that uses the at least one processor to receive identity information associated with a new client user to build a new data record that includes one or more of a plurality of attributes according to the identity information associated with the new client user;
      an identity information analyzer that uses the at least one processor to:
         generate sub-attributes from at least one attribute of the one or more of a plurality of attributes according to the identity information associated with the new client user in the new data record;
         associate a type of matching method, a type of match scoring method, and a sub-attribute threshold with each sub-attribute;
         access prior client user profiles, each of the prior client user profiles including identity information comprising attributes and sub-attributes relating to an existing client or a previous client;
         determine one or more suspicious prior client user profiles according to a comparison of each sub-attribute of the at least one attribute of the data record of the new client user with a corresponding sub-attribute of the prior client user profiles based on the type of matching method, the type of match scoring method, and the sub-attribute threshold; and
         identify suspicious activity when at least one suspicious prior client user profile is determined;
      a data aggregator that uses the at least one processor to:
         when suspicious activity is identified, retrieve transaction data associated with the at least one suspicious prior client user profile; and
         aggregate data including the new client user profile, the at least one suspicious prior client user profile, and the transaction data;
      an auditor that uses the at least one processor to audit the aggregated data associated with the suspicious activity;
      a learner that uses the at least one processor to:
         execute at least one machine learning algorithm against learning data to determine at least one of the type of matching method, the type of match scoring method, and the sub-attribute threshold, wherein the learning data includes training data input and historical analysis and decision data;
         discover and generate, via the at least one machine learning algorithm, one or more new matching methods, new match scoring methods, and new sub-attribute thresholds; and
         tune one or more of the new matching methods, new match scoring methods, and new sub-attribute thresholds, where into tune includes use of the at least one machine learning algorithm to increase accuracy of one or more of the new matching methods, new match scoring methods, and new sub-attribute thresholds in response to an implementation of one or more of the new matching methods, the new match scoring methods, and the new sub-attribute thresholds; and
      an interface engine that uses the at least one processor to:
         when an unresolved transaction is identified in the transaction data associated with the at least one suspicious prior client user profile, prompt the new client user to resolve the unresolved transaction or to provide additional identification information to validate that the new client user is not associated with the at least one suspicious prior client user profile.

2. The system of claim 1, wherein the identity information analyzer is further operative or configured to:
   match one or more qualifying criteria-associated attributes of the identity information associated with the new client user against corresponding attributes of prior client user profiles; and
   when one or more qualifying criteria-associated attributes match based on a set of qualifying criteria:
      flag the at least one suspicious prior client user profile; and
      match one or more suspicion criteria-associated attributes of the identity information associated with the new client user against corresponding attributes of the flagged at least one suspicious prior client user profile; and
   when one or more suspicion criteria-associated attributes match based on a set of suspicion criteria, identify suspicious activity.

3. The system of claim 2, wherein the identity information analyzer uses fuzzy logic matching methods or a combination of fuzzy logic matching methods and exact matching methods to identify matches between the identity information associated with the new client user and a prior client user profile.

4. The system of claim 2, wherein the set of qualifying criteria include:
   an exact match or a fuzzy match of an address attribute of the identity information associated with the new client user and an address attribute of a prior client user profile; and
   an exact match or a fuzzy match of at least one additional attribute match.

5. The system of claim 4, wherein the at least one additional attribute match includes a match, between the identity information associated with the new client user and the prior client user profile, of an attribute selected from a group comprising:

a name attribute;
an address attribute;
a phone number attribute;
an email address attribute;
a social security number attribute;
an employer name attribute;
a state-issued identification number attribute;
a financial account number attribute;
an account login attribute; and
a household user profile name attribute.

6. The system of claim 2, wherein the set of suspicion criteria include:
an exact match or a fuzzy match of a name attribute of the identity information associated with the new client user and a name attribute of a prior client user profile; or
an exact match or a fuzzy match of two or more attributes other than the name attribute of the identity information associated with the new client user and the name attribute of a prior client user profile.

7. The system of claim 2, wherein the identity information analyzer is further operative or configured to use one or a combination of matching methods and scoring methods, wherein one or more of the matching methods or scoring methods are automatically configurable based on learned machine learning algorithms.

8. The system of claim 1, wherein the auditor is further operative or configured to determine whether a particular attribute of the at least one suspicious prior client user profile is associated with an amount owed or a piece of equipment due.

9. The system of claim 8, wherein the auditor is further operative or configured to apply decision criteria to one or more pieces of the aggregated data for further validating that the new client user is associated with the at least one suspicious prior client user profile.

10. The system of claim 8, wherein the auditor is further operative or configured to communicate with an external data source to access data associated with the new client user or the existing client or the previous client of the at least one suspicious prior client user profile, the data associated with at least one of:
previous addresses;
a current address;
a social security number;
previous phone numbers;
current phone numbers; and
a death indication.

11. The system of claim 1, wherein the interface engine is further operative or configured to generate a prompt or communication to a device associated with the new client user to prompt the new client user to resolve the unresolved transaction or to provide one or more forms of identification that can be evaluated by the auditor to validate that the user is who he/she says he/she is.

12. The system of claim 11, wherein the prompt or communication is one of:
an email;
a text message;
a notification;
an alert; or
a phone call.

13. The system of claim 1, wherein the auditor is further operative to:
receive an indication of a receipt of additional information provided by the new client user;
evaluate the additional information;
determine whether the additional information satisfies verification criteria or good account status criteria;
when the verification criteria or the good account status criteria are satisfied, verify the new client user and schedule a work order for providing services to the new client user; and
when the verification criteria nor the good account status criteria are satisfied, hold a work order for providing services to the new client user.

14. A method for detecting identity masking comprising:
receiving identity information associated with a new client user;
building a new data record that includes one or more of a plurality of attributes according to the identity information associated with the new client user;
generating sub-attributes from at least one attribute of the one or more of a plurality of attributes according to the identity information associated with the new client user in the new data record;
associating a type of matching method, a type of match scoring method, and a sub-attribute threshold with each sub-attribute
accessing prior client user profiles, each of the prior client user profiles including identity information comprising attributes and sub-attributes relating to an existing client or a previous client;
determining one or more suspicious prior client user profiles according to a comparison of each sub-attribute of the at least one attribute of the data record of the new client user with a corresponding sub-attribute of the prior client user profiles based on the type of matching method, the type of match scoring method, and the sub-attribute threshold;
identifying suspicious activity when at least one suspicious prior client user profile is determined;
when suspicious activity is identified, retrieving transaction data associated with the at least one suspicious prior client user profile;
aggregating data including the new client user profile, the at least one suspicious prior client user profile, and the transaction data;
auditing the aggregated data associated with the suspicious activity, wherein at least one machine learning algorithm is used as part of:
determining at least one of the type of matching method, the type of match scoring method, and the sub-attribute threshold using learning data that include straining data input and historical analysis and decision data;
discovering and generating one or more new matching methods, new match scoring methods, and new sub-attribute thresholds; and
tuning one or more of the new matching methods, new match scoring methods, and new sub-attribute thresholds, wherein the tuning includes use of the at least one machine learning algorithm to increase accuracy of one or more of the new matching methods, new match scoring methods, and new sub-attribute thresholds in response to an implementation of one or more of the new matching methods, the new match scoring methods, and the new sub-attribute thresholds; and
when an unresolved transaction is identified in the transaction data associated with the at least one suspicious prior client user profile, prompting the new client user to resolve the unresolved transaction or to provide additional identification information to validate that the new client user is not associated with the at least one suspicious prior client user profile.

15. The method of claim 14, further comprising:
matching one or more qualifying criteria-associated attributes of the identity information associated with the new client user against corresponding attributes of prior client user profiles using fuzzy logic matching methods or a combination of fuzzy logic matching methods and exact matching methods; and
when one or more qualifying criteria-associated attributes match based on a set of qualifying criteria:
  flagging the at least one suspicious prior client user profile;
  matching one or more suspicion criteria-associated attributes of the identity information associated with the new client user against corresponding attributes of the flagged at least one suspicious prior client user profile; and
  when one or more suspicion criteria-associated attributes match based on a set of suspicion criteria, identifying suspicious activity.

16. The method of claim 15, wherein determining whether one or more qualifying criteria-associated attributes match based on the set of qualifying criteria comprises:
identifying an exact match or a fuzzy match of an address attribute of the identity information associated with the new client user and an address attribute of a prior client user profile; and
identifying an exact match or a fuzzy match of at least one additional attribute match, wherein the at least one additional attribute match includes a match of an attribute selected from a group comprising:
  a name attribute;
  an address attribute;
  a phone number attribute;
  an email address attribute;
  a social security number attribute;
  an employer name attribute;
  a state-issued identification number attribute;
  a financial account number attribute;
  an account login attribute; and
  a household user profile name attribute.

17. The method of claim 16, wherein determining whether one or more suspicion criteria-associated attributes match based on the set of suspicion criteria comprises:
identifying an exact match or a fuzzy match of a name attribute of the identity information associated with the new client user and a name attribute of a prior client user profile; or
identifying an exact match or a fuzzy match of two or more attributes other than the name attribute of the identity information associated with the new client user and the name attribute of a prior client user profile.

18. The method of claim 14, wherein auditing the aggregated data associated with the suspicious activity comprises at least one of:
determining whether a particular attribute of the at least one suspicious prior client user profile is associated with an amount owed or a piece of equipment due; and
applying decision criteria to one or more pieces of the aggregated data for further validating that the new client user is associated with the at least one suspicious prior client user profile.

19. The method of claim 14, wherein:
prompting the new client user comprises generating a prompt or communication to a device associated with the new client user, the prompt or communication prompting the new client user to resolve the unresolved transaction or to provide one or more forms of identification that can be evaluated by the auditor to validate that the user is who he/she says he/she is; and
the method further comprises:
  receiving an indication of a receipt of additional information provided by the new client user;
  evaluating the additional information to determine whether the additional information satisfies verification criteria or good account status criteria;
  when the verification criteria or the good account status criteria are satisfied, verifying the new client user and schedule a work order for providing services to the new client user; and
  when the verification criteria nor the good account status criteria are satisfied, holding a work order for providing services to the new client user.

20. A non-transitory computer readable storage device that includes executable instructions which, when executed by a processor:
use a new record entry portal as part of receiving identity information associated with a new client user to build a new data record that includes one or more of a plurality of attributes according to the identity information associated with the new client user;
use an identity information analyzer as part of:
generating sub-attributes from at least one attribute of the one or more of a plurality of attributes according to the identity information associated with the new client user in the new data record;
associating a type of matching method, a type of match scoring method, and a sub-attribute threshold with each sub-attribute;
accessing prior client user profiles, each of the prior client user profiles including identity information comprising attributes and sub-attributes relating to an existing client or a previous client;
determining one or more suspicious prior client user profiles according to a comparison of each sub-attribute of the at least one attribute of the data record of the new client user with a corresponding sub-attribute of the prior client user profiles based on the type of matching method, the type of match scoring method, and the sub-attribute threshold; and
identifying suspicious activity when at least one suspicious prior client user profile is determined;
use a data aggregator as part of:
when suspicious activity is identified, retrieving transaction data associated with the at least one suspicious prior client user profile; and
aggregating data including the new client user profile, the at least one suspicious prior client user profile, and the transaction data;
use an auditor as part of auditing the aggregated data associated with the suspicious activity;
use a learner as part of:
executing at least one machine learning algorithm against learning data to determine at least one of the type of matching method, the type of match scoring method, and the sub-attribute threshold, wherein the learning data include straining data input and historical analysis and decision data;
discovering and generating, via the at least one machine learning algorithm, one or more new matching methods, new match scoring methods, and new sub-attribute thresholds; and tuning one or more of the new matching methods, new match scoring methods, and new sub-attribute thresholds, wherein the tuning includes using the at least one machine learning algorithm to increase accuracy of one or more of the new matching methods, new match scoring methods, and new sub-attribute thresholds in response to an implementation of one or more of the new matching methods, the new match scoring methods, and the new sub-attribute thresholds; and use an interface engine as part of:

when an unresolved transaction is identified in the transaction data associated with the at least one suspicious prior client user profile, prompting the new client user to resolve the unresolved transaction or to provide additional identification information to validate that the new client user is not associated with the at least one suspicious prior client user profile.

* * * * *